United States Patent [19]
Itomi et al.

[11] Patent Number: 5,234,089
[45] Date of Patent: Aug. 10, 1993

[54] TORQUE LIMITER

[75] Inventors: Shoji Itomi, Aichi; Masahiro Kurita, Kuwana, both of Japan

[73] Assignee: NTN Corporation, Osaka, Japan

[21] Appl. No.: 919,332

[22] Filed: Jul. 27, 1992

[30] Foreign Application Priority Data

Sep. 26, 1991 [JP] Japan .................................. 3-247323
Dec. 19, 1991 [JP] Japan ............................. 3-105073[U]
Apr. 22, 1992 [JP] Japan ............................... 4-26198[U]

[51] Int. Cl.⁵ ........................... F16D 7/00; F16D 47/04
[52] U.S. Cl. .................................. 192/48.92; 192/56 C; 464/40
[58] Field of Search ................... 192/48.1, 48.3, 48.92, 192/56 C; 464/30, 40

[56] References Cited

U.S. PATENT DOCUMENTS

| | | | |
|---|---|---|---|
| 1,629,420 | 5/1927 | Starkey | 192/56 C X |
| 1,985,126 | 12/1934 | Wemp | 192/48.92 |
| 2,618,137 | 11/1952 | White | 192/56 C X |
| 3,242,696 | 3/1966 | Kaplan | 464/40 |
| 3,618,730 | 11/1971 | Mould, III | 192/56 C |
| 4,610,339 | 9/1986 | Ciolli | 192/48.92 |

Primary Examiner—Richard M. Lorence
Attorney, Agent, or Firm—Nikaido, Marmelstein, Murray & Oram

[57] ABSTRACT

A torque limiter having an outer ring, an inner ring mounted in the outer ring and a shaft inserted in the inner ring. The outer ring is formed on the inner peripheral surface thereof with a plurality of tapered surfaces. Rollers are mounted between the tapered surfaces and a cylindrical outer peripheral surface of the inner ring. Torque setting springs are provided at one side of the rollers to urge the rollers toward a narrower side between the tapered surfaces and the cylindrical outer peripheral surface. A coil spring is mounted between the inner ring and the shaft so as to bind around the outer peripheral surface of the shaft and having one end thereof secured to the inner ring. The coil spring is mounted so as to be tightened when the shaft rotates in a direction opposite to the direction in which the torque setting springs urge the rollers.

5 Claims, 3 Drawing Sheets

TORQUE LIMITER

This invention relates to a torque limiter for transmitting and shutting off a turning torque.

A torque limiter is used to transmit a turning torque from a shaft to a rotary member such as a roller and cut it off when the load on the rotary member exceeds a certain level. Heretofore, coil spring type torque limiters and friction plate type limiters are known.

In a coil spring type torque limiter, torque transmission is turned on and off only for the rotation in one direction. When the shaft of the torque limiter is rotating in the opposite direction, torque transmission cannot be turned on and off.

On the other hand, in a friction plate type torque limiter, torque transmission is turned on and off for the rotation in either direction. But torque transmission is turned on and off at the same point in whichever direction the shaft rotates. It is impossible to produce a torque in one direction that is different from the torque produced in the opposite direction. When it is required that the torque transmitted to a rotary member rotated by a shaft in one direction be substantially different from the torque transmitted when the shaft turns in the opposite direction, two torque limiters have to be used, different in the direction of transmission and the magnitude of torque. This is not only a factor in raising the cost but will also make assembly more difficult.

An object of this invention is to provide a compact torque limiter which is simple in structure and which can transmit torques of different magnitudes for forward and backward rotations.

In order to solve the above problems, according to the present invention, there is provided a torque limiter comprising an outer ring, an inner ring mounted in the outer ring, a shaft extending through the inner ring, the outer ring being formed on the inner peripheral surface thereof with a plurality of tapered surfaces, rollers mounted between the tapered surfaces and a cylindrical outer peripheral surface of the inner ring, torque setting springs provided at one side of the rollers for urging the rollers toward a narrower side between the tapered surfaces and the cylindrical outer peripheral surface, and a coil spring mounted between the inner ring and the shaft so as to bind around the outer peripheral surface of the shaft and having one end thereof secured to the inner ring, the coil spring being mounted so as to be tightened when the shaft rotates in a direction opposite to the direction in which the torque setting springs urge the rollers.

When transmitting the rotation of a shaft to a rotary member such as a roller through the torque limiter described above, the rotary member is provided with a bore which opens to one side thereof. The torque limiter is inserted in the bore and the outer ring is arranged so that it will not rotate with respect to the rotary member. A lid is mounted on the opening of the bore to prevent the torque limiter from coming out.

In this assembled state, when the shaft is rotated in such a direction that the coil spring is tightened, the rotation of the shaft is transmitted to the inner ring through the coil spring and further to the outer ring through the rollers, thus rotating the rotary member together with the outer ring. In this state, when the load on the rotary member increases and the force with which the inner ring pushes the rollers in a disengaging direction balances with the force of the torque setting spring, slip occurs between the inner ring and the rollers. Torque transmission is now cut off.

On the other hand, when the shaft is turned in the opposite direction to the above, the coil spring expands diametrically. When the force with which the coil spring binds the shaft balances with the frictional force therebetween, slip occurs between the shaft and the coil spring, allowing the shaft to run idle.

While idling, if the shaft should touch the inner ring, it would be damaged on the outer surface because the inner ring is made of a hard material. In order to prevent such surface damage, the coil spring is provided in the axial central part of the inner ring and a pair of oil-containing bearings are mounted on both ends of the inner peripheral surface of the inner ring to limit the axial movement of the coil spring. The shaft is supported on the oil-containing bearings.

When mounting the torque limiter in the rotary member, the assembly made up of the outer ring, inner ring, rollers and torque setting spring is inserted in the bore of the rotary member. The lid is mounted on the opening of the bore to prevent the assembly from coming out. The shaft is then inserted into the inner ring. In this assembling operation, since the inner diameter of the coil spring is smaller than the outer diameter of the shaft, when inserting the shaft into the inner ring, the inner ring will be pushed axially through the coil spring and come out of the bore. This hampers the assembling efficiency. In order to facilitate the assembly, the inner side of the lid is preferably located opposite to the end face of the inner ring to keep the inner ring from coming out.

As described above, the torque limiter according to this invention can transmit torques of different magnitudes for forward and backward rotations. It is made up of small number of parts and its structure is simple. Thus, its manufacturing cost is low.

Further, by the provision of a pair of oil-containing bearings on the inner peripheral surface of the inner ring, while the shaft is idling, it is kept out of contact with the inner ring made of a hard material. Thus the outer surface of the shaft is protected against damage. Further, the pair of oil-containing bearings serve to prevent the axial movement of the coil spring. Thus, the inner ring and the coil spring never separate. This improves the assembling efficiency.

Other features and objects of the present invention will become apparent from the following description taken with reference to the accompanying drawings, in which.

Now, we will describe the embodiments of this invention with reference to the accompanying drawings.

Figure 1:
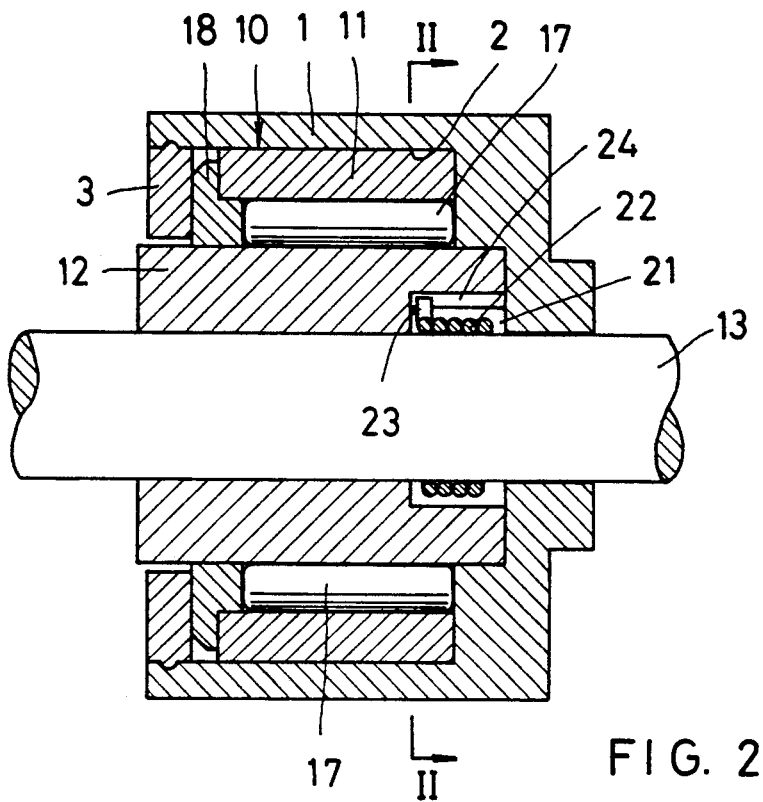
FIG. 1 is a vertical sectional front view of one embodiment of the torque limiter according to this invention.
Figure 2:
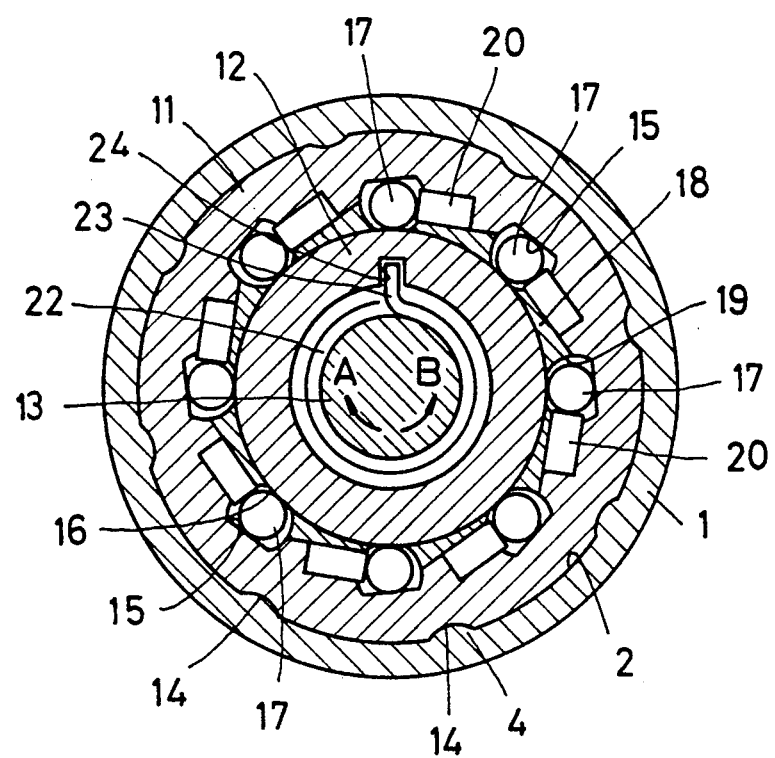
FIG. 2 is a sectional view taken along line II—II of FIG. 1.

FIGS. 1 and 2 show the torque limiter according to this invention as mounted in a rotary member 1. The rotary member 1 is a roller but is not limited thereto. For example, it may be a sprocket, gear or pulley. The rotary member 1 is molded of a synthetic resin and is provided with an axial bore 2 opening to one end thereof. A torque limiter 10 is mounted in this bore 2. A lid 3 is fitted in the opening of the bore 2 to prevent the torque limiter 10 from coming out.

The torque limiter 10 comprises an outer ring 11, an inner ring 12 and a shaft 13 extending through the inner ring 12. A plurality of axially extending grooves 14 are formed in the outer peripheral surface of the outer ring 11. The rotary member 1 is provided on its inner peripheral surface with ribs 4 each engaging the corresponding groove 14 to prevent relative rotation between the rotary member 1 and the outer ring 11.

Also, the outer ring 11 is provided on the inner peripheral surface with a plurality of equidistant tapered surfaces 15. A roller 17 is mounted between each tapered surface 15 and a cylindrical outer periphery of the inner ring 12. The tapered surface 15 may be straight or curved. The rollers 17 are received in pockets 19 formed in a cage 18 mounted between the outer ring 11 and the inner ring 12. On one side of each roller 17, a torque setting spring 20 is provided to urge the roller 17 into engagement between the tapered surface 15 and a cylindrical outer peripheral surface 16.

In one end of the inner ring 12 is formed a spring housing hole 21 in which is mounted a coil spring 22. (FIG. 1) This spring tightly binds around the outer peripheral surface of the shaft 13 and has its one end secured to the inner ring 12.

Figure 3:
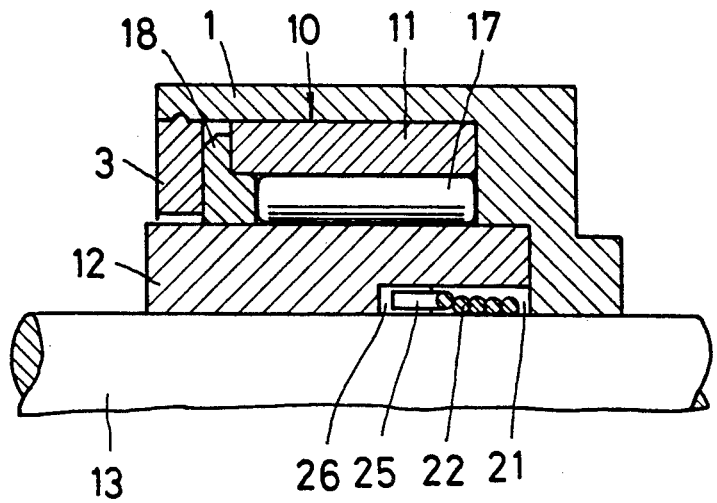
FIG. 3 is a vertical sectional front view of another embodiment.

In FIG. 2, in order to couple the coil spring 22 to the inner ring 12, a diametrically bent piece 23 is provided at one end of the coil spring 22 and engaged in a groove 24 formed in the inner periphery of the inner ring 12. But, as shown in FIG. 3, an axially bent piece 25 provided at one end of the coil spring 22 may be engaged in a cutout 26 formed in the closed end of the spring housing hole 21. When the shaft 13 rotates in such a direction that the rollers 17 disengage from the tapered surfaces 15 and the cylindrical outer surface 16, the coil spring 22 is tightened by the contact with the shaft 13.

When the coil spring 22 is tightened against the shaft 13 (direction of arrow A in FIG. 2), the rotation of the shaft 13 is transmitted through the coil spring 22 to the inner ring 12. Also, the rotation of the inner ring 12 is transmitted to the outer ring 11 through the rollers 17.

In this state, when the turning torque from the inner ring 12 to the outer ring 11 exceeds a predetermined spring force of the torque setting springs 20, the rollers 17 will move toward the wider areas of the spaces defined between the tapered surfaces 15 and the cylindrical outer surface 16 of the inner ring 12, against the elastic force of the torque setting springs 20. Slip thus occurs between the inner ring 12 and the rollers 17, cutting off torque transmission to the outer ring 11.

When the shaft 13 rotates in the direction of arrow B, the coil spring 22 is unwound and the force with which the coil spring 22 binds the shaft 13 reduces. When the binding force balances with the frictional force therebetween, slip occurs, allowing the shaft 13 to run idle. While the shaft is idling, the shaft 13 and the inner ring 12 rotate relative to each other. Thus, the inner ring 12 should preferably be made of a sintered oil-containing metal to improve the lubricity between the inner ring 12 and the shaft 13.

In this way, while the shaft 13 is rotating in the direction of arrow A, torque transmission is turned on and off by the action of the spring force of the torque setting spring 20. When it turns in the opposite direction, torque transmission is turned on and off by the action of the binding force with which the coil spring 22 binds the shaft 13. By setting the spring force of the torque setting spring 20 at a value substantially different from the binding force of the coil spring 22, the torque transmitted when the shaft turns in one direction can be made different from the torque transmitted when the shaft turns in the opposite direction.

Figure 4:
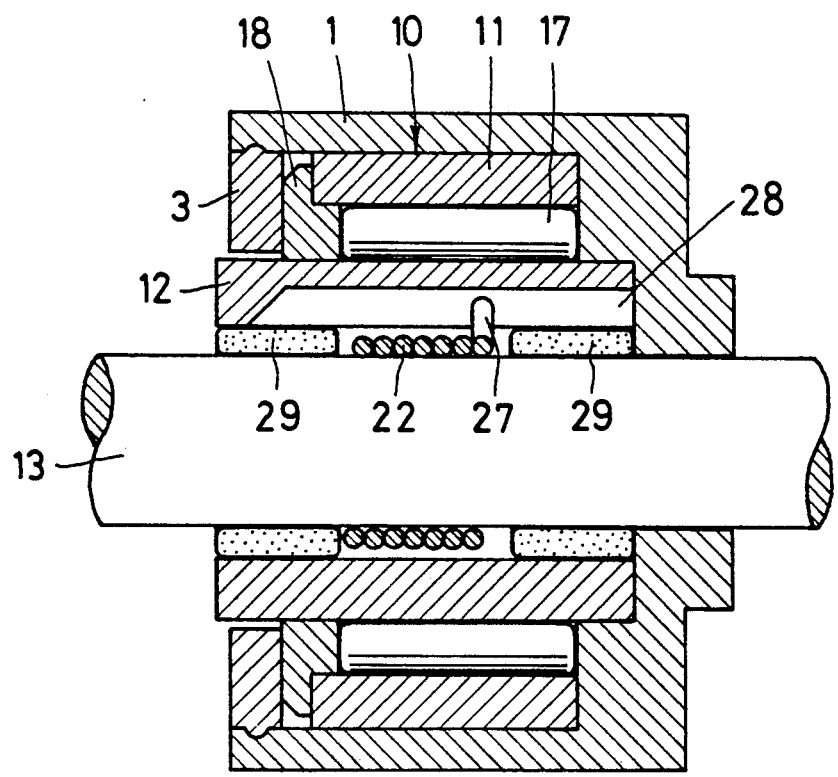
FIG. 4 is a vertical sectional front view of a further embodiment.
Figure 5:
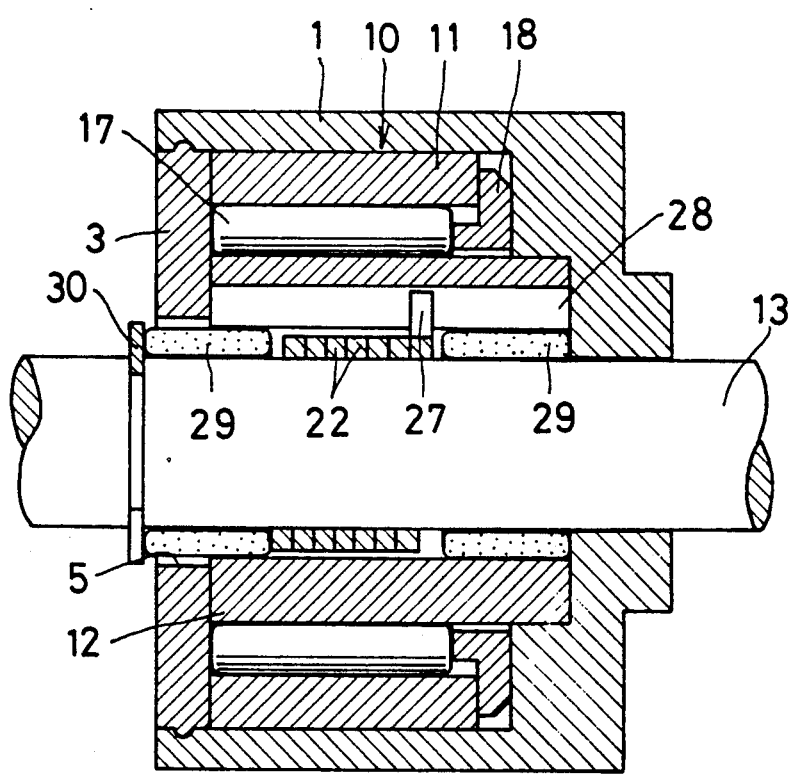
FIG. 5 is a vertical sectional front view of a still another embodiment.

FIGS. 4 and 5 show further embodiments of the torque limiter according to this invention. The torque limiter shown in FIG. 4 is not provided with the spring housing hole 21 shown in FIG. 1. The coil spring 22 is provided in the axial central part of the inner ring 12. It is provided at one end with a diametrically bent piece 27 which is engaged in an axial groove 28 formed in the inner peripheral surface of the inner ring 12. A pair of oil-containing bearings 29 are mounted on both ends of the inner peripheral surface of the inner ring 12 to keep the coil spring 22 from moving axially.

With this arrangement, since the shaft 13 is supported on the pair of oil-containing bearings 29, the shaft 13 is kept out of contact with the inner ring 12 made of a hard material. Thus, while the shaft 13 is rotating, its outer surface is protected against damage.

In the torque limiter shown in FIG. 5, the lid 3, provided to keep the torque limiter 10 from coming out, has its inner side opposed to the end face of the inner ring 12 to prevent the axial movement of the inner ring 12. With this arrangement, when inserting the shaft 13 into the inner ring 12, it is prevented from moving axially. Thus, the shaft 13 can be mounted easily. Also, since the oil-containing bearing 29 has its end protruding from the lid 3, the lid is kept out of contact with a snap ring 30 mounted on the shaft 13 to hold the rotary member 1 in position. Thus, the rotation of the rotary member 1 will not be affected by the snap ring 30.

What is claimed is:

1. A torque limiter, comprising:
   an outer ring;
   an inner ring mounted in said outer ring;
   a shaft extending through said inner ring, said outer ring being formed on an inner peripheral surface thereof with a plurality of tapered surfaces;
   a plurality of rollers mounted between the tapered surfaces and a cylindrical outer peripheral surface of said inner ring;
   a plurality of torque setting springs each provided at one side of corresponding rollers for urging said rollers in a first direction toward a narrower side between the tapered surfaces and the cylindrical outer peripheral surface;
   a coil spring mounted between said inner ring and said shaft so as to bind around an outer peripheral surface of said shaft and having one end thereof secured to said inner ring, said coil spring being mounted so as to be tightened when said shaft rotates in a second direction opposite to the first direction in which said torque setting springs urge said rollers,
   said outer ring having spring guide surfaces for guiding radial outer sides of said torque setting springs, and spring supporting surfaces for supporting ends of said torque setting springs opposite to the ends of said springs near said rollers, and
   said torque setting springs being supported in position by said spring supporting surfaces of said outer ring; and
   a cage mounted between said outer ring and said inner ring, said cage having defined therein a plurality of pockets each formed so as to receive each of said plurality of rollers and corresponding spring guide surfaces of said outer ring, wherein the pockets guide radial inner sides of said plurality of torque setting springs.

2. A torque limiter as claimed in claim 1, wherein said coil spring is provided at a central part of the inner peripheral surface of said inner ring and wherein a pair of oil-containing bearings are provided at both ends of the inner peripheral surface of said inner ring to limit axial movement of said coil spring.

3. A torque limiter assembly, comprising:

a torque limiter including an outer ring, an inner ring mounted in the outer ring, a shaft extending through the inner ring, the outer ring being formed on an inner peripheral surface thereof with a plurality of tapered surfaces, a plurality of rollers mounted between the tapered surfaces and a cylindrical outer peripheral surface of the inner ring, a plurality of torque setting springs each provided at one side of the corresponding rollers for urging the rollers in a first direction toward a narrower side between the tapered surfaces and the cylindrical outer peripheral surface, and a coil spring mounted between the inner ring and the shaft so as to bind around an outer peripheral surface of the shaft and having one end thereof secured to the inner ring, the coil spring being mounted so as to be tightened when the shaft rotates in a second direction opposite to the first direction in which the torque setting springs urge the rollers; and a rotary member having a main body with a closed end and an open end, the closed end having defined thereon an axial bore with said torque limiter being mounted in said rotary member with a first end of the shaft positioned through the axial bore such that the outer ring is prevented from rotating with respect to said rotary member, and a lid mounted on the open end of the main body with an inner axial surface of the lid disposed opposite to an end face of the inner ring, the lid having defined thereon an axial bore through which a second end of the shaft is positioned.

4. A torque limiter as claimed in claim 3, wherein the coil spring is provided at a central part of the inner peripheral surface of the inner ring and wherein a pair of oil-containing bearings are provided at both ends of the inner peripheral surface of the inner ring to limit axial movement of the coil spring.

5. A torque limiter assembly as claimed in claim 4, wherein one of the oil-containing bearings provided near said lid has one end thereof protruding outwardly from a central hole formed in said lid.

* * * * *